(12) United States Patent
Deering et al.

(10) Patent No.: US 11,128,591 B1
(45) Date of Patent: Sep. 21, 2021

(54) DYNAMIC INTERACTION OF A DYNAMIC IDEOGRAM IN AN ELECTRONIC MESSAGING ENVIRONMENT

(71) Applicant: Cisco Technology, Inc., San Jose, CA (US)

(72) Inventors: Christopher Deering, County Galway (IE); Colin Olivier Louis Vidal, Gennevilliers (FR); Jimmy Coyne, Galway (IE)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/004,678

(22) Filed: Aug. 27, 2020

(51) Int. Cl.
*H04L 12/58* (2006.01)

(52) U.S. Cl.
CPC .............. *H04L 51/18* (2013.01); *H04L 51/10* (2013.01); *H04L 51/26* (2013.01)

(58) Field of Classification Search
CPC ......... H04L 51/18; H04L 51/10; H04L 51/26; H04L 67/025; H04L 69/322; G06Q 10/10
See application file for complete search history.

(56) References Cited

U.S. PATENT DOCUMENTS

| | | | | |
|---|---|---|---|---|
| 6,990,452 | B1 * | 1/2006 | Ostermann | G06Q 10/107 704/260 |
| 9,530,119 | B1 * | 12/2016 | Grisso | H04L 12/1414 |
| 9,846,999 | B1 * | 12/2017 | Pickover | H04M 1/72403 |
| 10,025,972 | B2 | 7/2018 | Matas et al. | |
| 10,306,395 | B1 * | 5/2019 | Lyren | G09G 5/37 |
| 10,516,629 | B2 | 12/2019 | Wang et al. | |
| 10,592,098 | B2 | 3/2020 | Chaudhri et al. | |
| 10,606,443 | B2 | 3/2020 | Rolih et al. | |
| 2004/0066932 | A1 * | 4/2004 | Seligmann | H04W 4/029 379/373.01 |
| 2009/0128567 | A1 * | 5/2009 | Shuster | G06T 13/40 345/473 |
| 2012/0004511 | A1 * | 1/2012 | Sivadas | H04N 1/00307 600/300 |
| 2013/0019187 | A1 * | 1/2013 | Hind | H04L 65/4023 715/753 |
| 2013/0095864 | A1 * | 4/2013 | Marovets | H04L 51/08 455/466 |

(Continued)

OTHER PUBLICATIONS

Wikipedia, "Mii", 9 pages, Aug. 6, 2020; https://en.wikipedia.org/wiki/Mii.

(Continued)

*Primary Examiner* — Sargon N Nano
(74) *Attorney, Agent, or Firm* — Edell, Shapiro & Finnan, LLC

(57) ABSTRACT

In one example, a trigger is obtained for a dynamic ideogram to dynamically interact with the electronic messaging environment. In response to the trigger, it is determined how the dynamic ideogram is to dynamically interact with the electronic messaging environment including performing an analysis of the electronic messaging environment. Based on the analysis of the electronic messaging environment, instructions to render the dynamic ideogram to dynamically interact with the electronic messaging environment are generated for a first user device configured to communicate with a second user device via the electronic messaging environment.

20 Claims, 7 Drawing Sheets

(56) References Cited

U.S. PATENT DOCUMENTS

| | | | | |
|---|---|---|---|---|
| 2014/0052792 | A1* | 2/2014 | Dunko | G10L 25/63 |
| | | | | 709/206 |
| 2016/0063874 | A1* | 3/2016 | Czerwinski | G06Q 10/107 |
| | | | | 434/236 |
| 2016/0142362 | A1* | 5/2016 | Fitzner | H04L 51/063 |
| | | | | 709/206 |
| 2016/0259526 | A1* | 9/2016 | Lee | H04L 51/10 |
| 2016/0292217 | A1* | 10/2016 | Sinha | H04M 1/72569 |
| 2017/0111503 | A1* | 4/2017 | McGann | H04M 3/5233 |
| 2017/0111505 | A1* | 4/2017 | McGann | H04M 3/5235 |
| 2017/0111507 | A1* | 4/2017 | McGann | H04L 67/02 |
| 2017/0111509 | A1* | 4/2017 | McGann | H04M 3/5232 |
| 2018/0081515 | A1* | 3/2018 | Block | G06F 3/0482 |
| 2018/0335930 | A1* | 11/2018 | Scapel | G06F 3/04842 |
| 2018/0336184 | A1* | 11/2018 | Bellegarda | G06F 40/30 |
| 2018/0336715 | A1* | 11/2018 | Rickwald | G06K 9/00315 |
| 2019/0156838 | A1* | 5/2019 | Kannan | G10L 15/22 |
| 2019/0279317 | A1* | 9/2019 | Burton | H04L 51/16 |
| 2019/0289414 | A1* | 9/2019 | Lyren | H04S 7/302 |
| 2020/0106728 | A1 | 4/2020 | Grantham et al. | |
| 2020/0180719 | A1* | 6/2020 | Chadwick | B62H 5/14 |
| 2020/0320518 | A1* | 10/2020 | Simas | H04L 9/0637 |

OTHER PUBLICATIONS

Apple Support, "How to use Animoji on your iPhone and iPad Pro", 4 pages, retrieved from Internet: Aug. 18, 2020; https://support.apple.com/en-us/HT208190.

Giphy, "Animated Emoji Explore Animated Emoji GIFs", 5 pages, retrieved from Internet Aug. 18, 2020; https://giphy.com/explore/animated-emoji.

Cerulean Studios, "The Creators of Trillian and Trillian Pro IM Clients", 3 pages, May 1, 2010, http://www.ceruleanstudios.com/faqs.

Brian Roemmele, "How Does Apple's Dynamic Emoji Technology Work?", Read Multiplex, Sep. 9, 2017, 9 pages, http://readmultiplex.com/2017/09/09/how-does-apples-dynamic-emoji-technology-work/.

Online Tutorials, "Animated Eyes Follow Mouse Cursor | Javascript Mousemove", Oct. 23, 2019; https://www.youtube.com/watch?v=WqgKe3dcXxg.

* cited by examiner

DYNAMIC INTERACTION OF A DYNAMIC IDEOGRAM IN AN ELECTRONIC MESSAGING ENVIRONMENT

TECHNICAL FIELD

The present disclosure relates to electronic messaging.

BACKGROUND

Emojis are sent in electronic communications using combinations of textual symbols (e.g., sending a colon and a bracket to indicate a smiley face). Dedicated static Unicode emojis are also available. In addition, there exist animated emojis which are simple sequences (e.g., loops) of frames or static images.

DESCRIPTION OF EXAMPLE EMBODIMENTS

Overview

Figure 1:
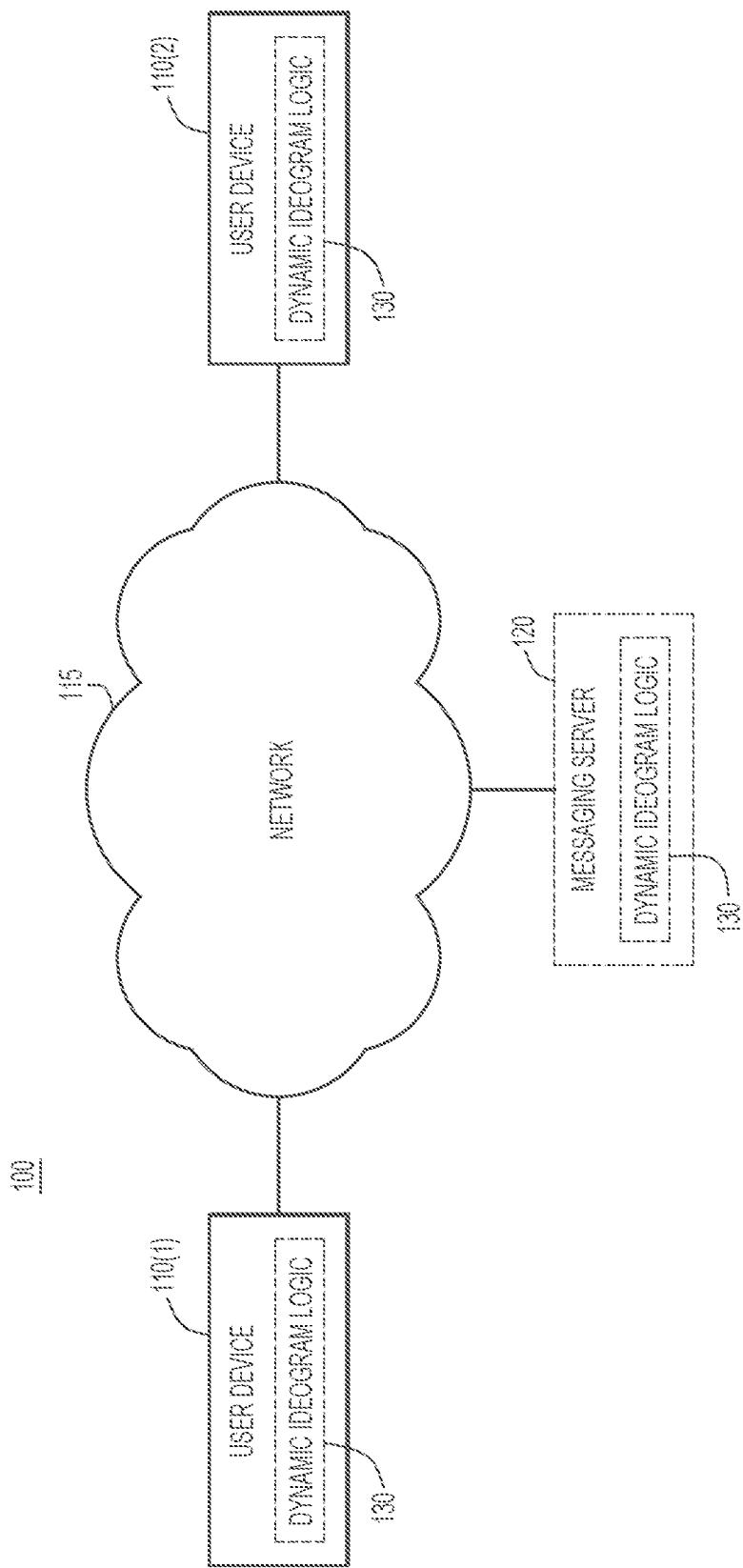
FIG. 1 illustrates a block diagram of a system configured for dynamic interaction of a dynamic ideogram in an electronic messaging environment, according to an example embodiment.

In one example embodiment, a trigger is obtained for a dynamic ideogram to dynamically interact with the electronic messaging environment. In response to the trigger, it is determined how the dynamic ideogram is to dynamically interact with the electronic messaging environment including performing an analysis of the electronic messaging environment. Based on the analysis of the electronic messaging environment, instructions to render the dynamic ideogram to dynamically interact with the electronic messaging environment are generated for a first user device configured to communicate with a second user device via the electronic messaging environment.

Example Embodiments

Humans rely heavily on dynamic and responsive social phenomena when expressing non-verbal communication. For example, humans are prone to reactive expressions and unconscious mimicking whereby body language is mirrored and reflected. As such, textual communication can lack the nuance and richness of in-person interaction. Often, a purely textual string can have an ambiguous meaning without further qualification, markup, or context.

Existing static and animated emojis do not enrich textual communications in a way that elevates the resulting chat to a level of expressiveness that is similar to in-person meetings. This is because, fundamentally, existing emojis do not serve as adequate proxies for humans. For example, there is no interaction between a user and the emoji—instead, the recipient user merely observes a rendered emoji. This does not fulfill the bidirectional interaction inherent to in-person human contact.

Accordingly, in order to enrich textual communication, provided herein is a dynamic ideogram (e.g., emoji, symbol, character, etc.) configured to dynamically interact within an electronic messaging environment (e.g., a chat window/page) in an intelligent manner. Rather than rendering as a simple loop or linear animation/video, the dynamic ideogram may dynamically interact with one or more users (e.g., the recipient user) through the rendering environment/context. The ideogram may be "dynamic" because it may change over time in the electronic messaging environment in response to certain triggers, such as changes in the electronic messaging environment, rather than rendering as a simple loop regardless of the presence of any potential triggers. This may provide a dynamic bidirectional interaction between the message recipient and the dynamic ideogram to enhance the textual medium in a way that a static or simply animated emoji cannot.

The dynamic ideogram may be programmed with one or more tasks to accomplish within the rendered environment. The behavior/characteristics of the dynamic ideogram may represent the emotional intent of the sending user (e.g., happy, sad, angry, etc.). Thus, the dynamic ideogram may serve as a proxy actor for the sender and may be animated based on the context in which the dynamic ideogram is rendered. That is, the dynamic ideogram may interact with the rendered environment in a manner that is representative of the emotion to be conveyed. This may provide a dimension of richness and interactive engagement to textual communication.

FIG. 1 illustrates a block diagram of an example system 100 configured for dynamic interaction of a dynamic ideogram in an electronic messaging environment. System 100 includes user devices 110(1) and 110(2), network 115, and in some embodiments, a messaging server 120. User devices 110(1) and 110(2) and messaging server 120 are in communication with the network 115. User devices 110(1) and 110(2) may be any electronic device suitable for electronic messaging, such as mobile devices (e.g., smart phones, laptops, etc.), desktop computers, etc. User devices 110(1) and 110(2) may include interfaces to obtain user input for an electronic messaging environment (e.g., computer mice, keyboards, touch screen interface, microphones, cameras, etc.) and displays to present content in the electronic messaging environment (e.g., screens, etc.). User devices 110(1) and 110(2) may be configured to communicate with each other via the electronic messaging environment, and in particular to enable users of user devices 110(1) and 110(2) to participate in an electronic chat session. User devices 110(1) and 110(2) may communicate with each other via network 115 directly, or through messaging server 120.

Messaging server 120 may manage an electronic messaging environment, including obtaining electronic messages from user devices 110(1) and 110(2) and providing instructions to render/display the electronic messaging environment on user devices 110(1) and 110(2) accordingly. Messaging server 120 may thereby host/facilitate an electronic messaging session between user devices 110(1) and 110(2). For example, messaging server 120 may enable communications such as an enterprise messaging application, Short Message Service (SMS), an online chat room, virtual workspaces, etc. In one specific example, user devices 110(1) and 110(2) may be enterprise user devices configured to communicate with each other via messaging server 120 over an enterprise network. While only user devices 110(1) and 110(2) are shown, it will be appreciated that the techniques described herein may apply to one-on-one or group chats including any suitable number of user devices.

In one example, messaging server 120 includes dynamic ideogram logic 130, which causes messaging server 120 to perform one or more operations. Messaging server 120 may obtain a trigger for a dynamic ideogram in an electronic messaging environment to dynamically interact with the electronic messaging environment. In response to the trigger, messaging server 120 may determine how the dynamic ideogram is to dynamically interact with the electronic messaging environment, including performing an analysis of the electronic messaging environment. Based on the analysis of the electronic messaging environment, messaging server 120 may generate, for user devices 110(1) and/or 110(2), instructions to render the dynamic ideogram to dynamically interact with the electronic messaging environment. Messaging server 120 may provide the instructions to user devices 110(1) and/or 110(2), which may render the dynamic ideogram according to the instructions.

In another example, user devices 110(1) and/or 110(2) may also/alternatively include dynamic ideogram logic 130 to enable user devices 110(1) and/or 110(2) to perform one or more operations described herein, such as obtaining the trigger, determining how the dynamic ideogram is to dynamically interact with the electronic messaging environment, and generating the instructions to render the dynamic ideogram. User devices 110(1) and/or 110(2) may render the dynamic ideogram according to the instructions. Thus, techniques described herein may be performed by any suitable entity, depending on the specific topology of the system involved. For example, dynamic ideogram logic 130 may be provided on messaging server 120 in an enterprise context, whereas in a peer-to-peer client system/architecture or a mesh network, which may not include messaging server 120, user devices 110(1) and/or 110(2) may implement dynamic ideogram logic 130 to perform the techniques described herein. It will be appreciated that any suitable operations described herein as being performed by a server may alternatively be performed by a user device, and vice versa.

Figure 2:
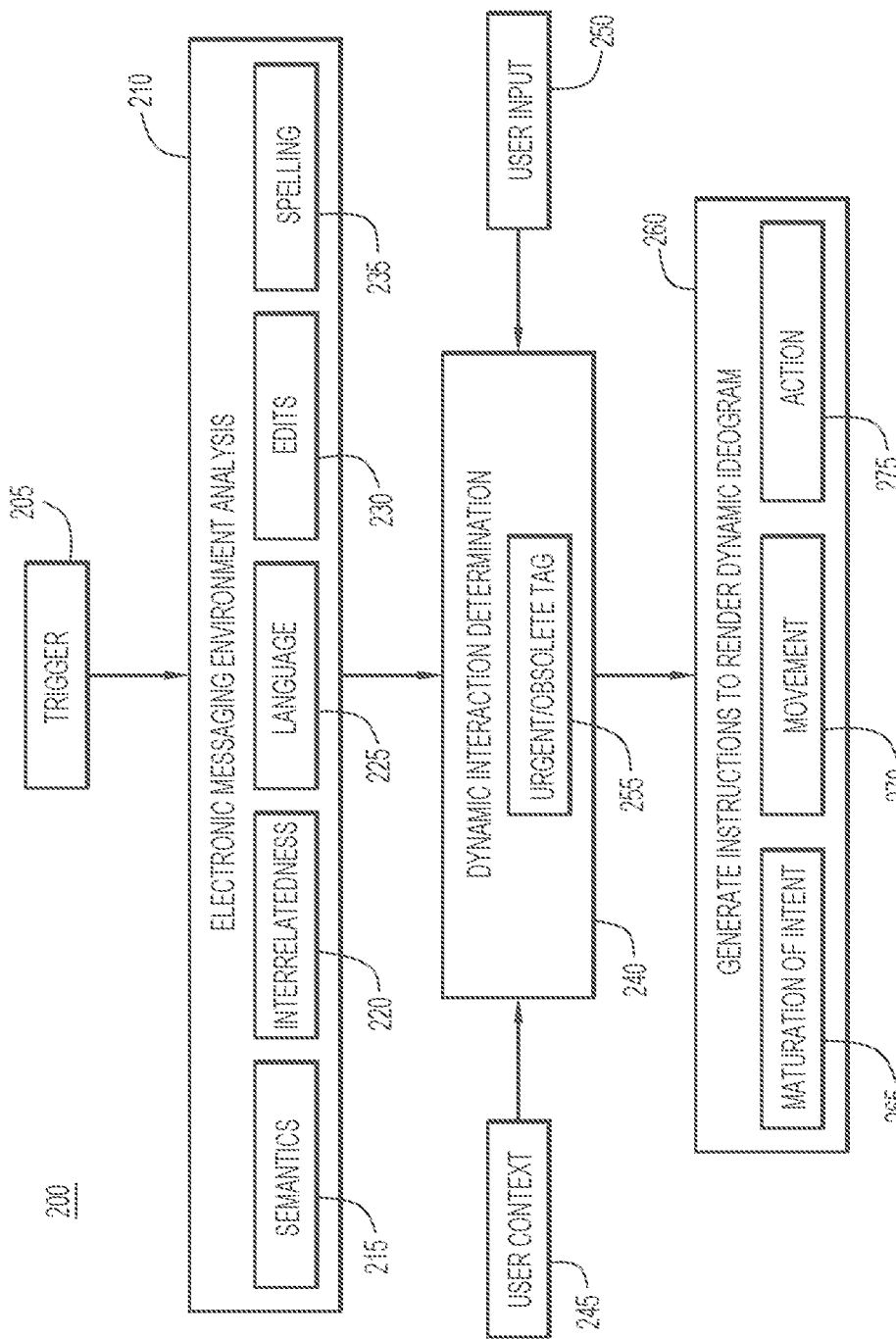
FIG. 2 illustrates a flowchart of a method for dynamic interaction of a dynamic ideogram in an electronic messaging environment, according to an example embodiment.

With continued reference to FIG. 1, FIG. 2 illustrates a flowchart of an example method 200 for dynamic interaction of a dynamic ideogram in an electronic messaging environment. While the operations of FIG. 2 are described as being performed by messaging server 120, it will be appreciated that user devices 110(1) and/or 110(2) may additionally/alternatively perform these operations. At operation 205, messaging server 120 obtains a trigger for a dynamic ideogram in an electronic messaging environment to dynamically interact with the electronic messaging environment. The trigger may reflect an emotional intent of a user (e.g., an original emotional intent of the user or an updated/maturated/evolved emotional intent). In one example, obtaining the trigger may include determining that a given amount of time has elapsed. In another example, obtaining the trigger may include obtaining an indication of a user action from user devices 110(1) and/or 110(2). The user action may include initially sending the dynamic ideogram in the electronic messaging environment or any subsequent user action provided via a user mouse, keyboard, etc.

At operation 210, messaging server 120 performs an analysis of the electronic messaging environment. The analysis may involve Natural Language Processing (NLP), artificial intelligence (e.g., machine learning), using semantic networks, and/or any other suitable techniques. The analysis may apply to the content of the messages in the electronic messaging environment. In one example, at operation 215, messaging server 120 performs a semantic analysis of one or more words in the electronic messaging environment (e.g., a semantic analysis of textual content). In another example, at operation 220, messaging server 120 performs an analysis of an interrelatedness of a plurality of messages in the electronic messaging environment. This may involve an analysis of the content of the conversation, including preceding messages, message hierarchy, subsequent replies, resolution of a subject/topic, etc. In another example, at operation 225, messaging server 120 performs an analysis based on a language of one or more words in the electronic messaging environment (e.g., English, Spanish, etc.). In another example, at operation 230, messaging server 120 performs an analysis based on one or more edits made to one or more messages in the electronic messaging environment. In another example, at operation 235, messaging server 120 performs an analysis based on a spelling (e.g., misspelling) of one or more words in the electronic messaging environment. In still another example, messaging server 120 may determine a "tone" or emotional intent associated with the conversation (e.g., whether the word(s) convey a sense of happiness, impatience, stress, etc.). For example, messaging server 120 may analyze the speed of typing a user makes when entering text into the electronic messaging environment and from that speed derive a "tone" or emotional intent.

At operation 240, messaging server 120 may determine how a dynamic ideogram is to dynamically interact with the electronic messaging environment (e.g., determining the behavior of an interactive emoji). Messaging server 120 may utilize an artificial intelligence (e.g., machine learning) engine to help make this determination. In one example, messaging server 120 may provide results of the analysis from operation 210 to the artificial intelligence engine. Messaging server 120 may also provide input regarding user context and/or user input to the artificial intelligence engine.

At operation 245, messaging server 120 may determine how the dynamic ideogram is to dynamically interact with the electronic messaging environment based on user context. In one example, messaging server 120 determines how the dynamic ideogram is to dynamically interact with the electronic messaging environment based on user availability. User availability may be determined based on a calendar schedule of the user (e.g., whether the user has a meeting schedule at a given time, such as when the dynamic ideogram is sent). User availability may also be determined based on whether the user is out of the office (e.g., whether the user has set an "Out of Office" indication). User availability may also be determined based on a presence indication of the user (e.g., "active," "away," "offline," "on a call," "busy," "presenting," etc.).

Messaging server 120 may also determine how the dynamic ideogram is to dynamically interact with the electronic messaging environment based on other user context. For example, messaging server 120 may determine how the dynamic ideogram is to dynamically interact with the electronic messaging environment based on a geographical location of user device 110(1) or user device 110(2) (e.g., a country in the which a user is located, the local time of the user, etc.). In another example, messaging server 120 may determine how the dynamic ideogram is to dynamically interact with the electronic messaging environment based on a type of user device 110(1) or user device 110(2) (e.g., whether user devices 110(1) and/or 110(2) are smart phones, laptops, desktop computers, enterprise user devices, personal user devices, etc.). In still another example, messaging server 120 may determine how the dynamic ideogram is to dynamically interact with the electronic messaging environment based on a role in an organization of a user (e.g., whether the user is a boss, manager, employer, co-worker, employee, staff, etc.).

At operation 250, messaging server 120 may determine how the dynamic ideogram is to dynamically interact with the electronic messaging environment based on user input. In one example, the user input may include mouse and/or keyboard input of the user. In another example, the user input may include historical user input, such as usage patterns of the sending user and/or the recipient user. The usage patterns may be used as parameters for rules and decision trees.

At operation 255, messaging server 120 may determine a length of time since a given message in the electronic messaging environment was sent and, based on the length of time, determine a level of priority of the given message. For example, messaging server 120 may determine how much time has passed since a message was last sent/input, and based on this information, messaging server 120 may feed an "urgency" or "obsolete" tag to the artificial intelligence engine. An "urgency" tag may indicate that it is increasingly important for the user to answer the message due to the length of time for which the message has gone unanswered. An "obsolete" tag may indicate that it is increasingly unimportant for the user to answer the message due to the length of time for which the message has gone unanswered.

At operation 260, messaging server 120 generates, for user device 110(1) and/or 110(2), instructions to render the dynamic ideogram to dynamically interact with the electronic messaging environment. In one example, at operation 265, messaging server 120 may generate instructions to update the dynamic ideogram to reflect a maturation of the emotional intent. In another example, at operation 270, messaging server 120 generates instructions to render the dynamic ideogram to dynamically change locations in the electronic messaging environment. For example, the dynamic ideogram may move within the electronic messaging environment based on navigation or motivated pathfinding within the textual environment. In still another example, at operation 275, messaging server 120 generates instructions to render the dynamic ideogram to dynamically perform an action. In one example, messaging server 120 generates instructions to render the dynamic ideogram to dynamically interact with the electronic messaging environment in-place (e.g., performing an action in-place).

Messaging server 120 may generate any suitable instructions to render the dynamic ideogram to dynamically interact with the electronic messaging environment. In one example, the dynamic ideogram may dynamically interact with user input (e.g., via a mouse and/or keyboard), while taking into account the emotional intent of the user. For instance, a dynamic ideogram configured to convey a "happy" emotion may dynamically orient itself to face a cursor as the user moves the cursor around the screen, and animate "happy" actions (e.g., wave, high-five, point, etc.) in the direction of the mouse. Thus, as the mouse moves around the screen, the dynamic ideogram may dynamically orient itself toward the current position of the mouse. In another example, a dynamic ideogram configured to convey an "angry," "disgruntled," or "huffy" emotion may gesture angrily towards the cursor (e.g., shaking a first) or by facing away from the cursor. In still another example, a dynamic ideogram may try to "grab" or "catch" the cursor as it passes close by the dynamic ideogram. In yet another example, a dynamic ideogram (e.g., a "ninja" emoji) may hide from the cursor as it passes close by the dynamic ideogram. In yet still another example, a user (e.g., the sending user) may select (e.g., "pick up") a dynamic ideogram and move (e.g., "drag," "carry," "throw," etc.) the dynamic ideogram to a particular spot in the electronic messaging environment.

In addition to user input from a mouse, a dynamic ideogram (e.g., one that has already been rendered) may react to user input in the form of keyboard presses of the user. For instance, the keyboard presses may be modeled as thuds to which the dynamic ideograms react (e.g., animating a slight bounce). In another example, a dynamic ideogram may also simulate hunger by "eating" adjacent characters. If there is no user input with which the dynamic ideogram can interact, the dynamic ideogram may dynamically enter a "bored" state (e.g., yawning, blinking, etc.).

In an example in which user devices 110(1) and/or 110(2) are mobile devices such as smart phones, one or more front-facing cameras of user devices 110(1) and/or 110(2) may be used to track the face position of the user(s) relative to the camera to enable the dynamic ideogram to orient toward the user(s) (e.g., making eye contact).

In another example, the dynamic ideogram may dynamically interact with other dynamic ideograms. For example, dynamic ideograms on the same page may point in unison to new messages arriving in the electronic messaging environment, or "cheer" in unison when certain events happen in the electronic messaging environment. Adjacent dynamic ideograms may dynamically interact in a direct manner, such as playing ping-pong upon entering a "bored" state, "high-fiving" each other, shaking hands, etc.

In another example, the dynamic ideogram may dynamically perform one or more dedicated messaging tasks. For example, when a message is being edited, the dynamic ideogram may be rendered to simulate modifying or manipulating text (e.g., to correct a misspelling such as changing "teh" to "the" by switching the letters "e" and "h"). Or, if a message refers to another message (e.g., by quoting a previous message), the dynamic ideogram may "climb" up previous messages displayed above and "point" to that quoted message. A dynamic ideogram may also act as a reminder to respond to a message. For example, a dynamic ideogram may "climb" up previous messages displayed above and "point" to a message to indicate that a user is awaiting a response to that message. If the user has an upcoming in-person or electronic meeting and may leave the existing chat session/window/application for a physical or virtual room, the dynamic ideogram may become even more animated in signaling that the user is awaiting a response. The dynamic ideogram may dynamically interact with the electronic messaging environment in any suitable manner. A light-hearted approach that incorporates humor may be used to help put users at ease and create an enjoyable user experience.

Figure 3:
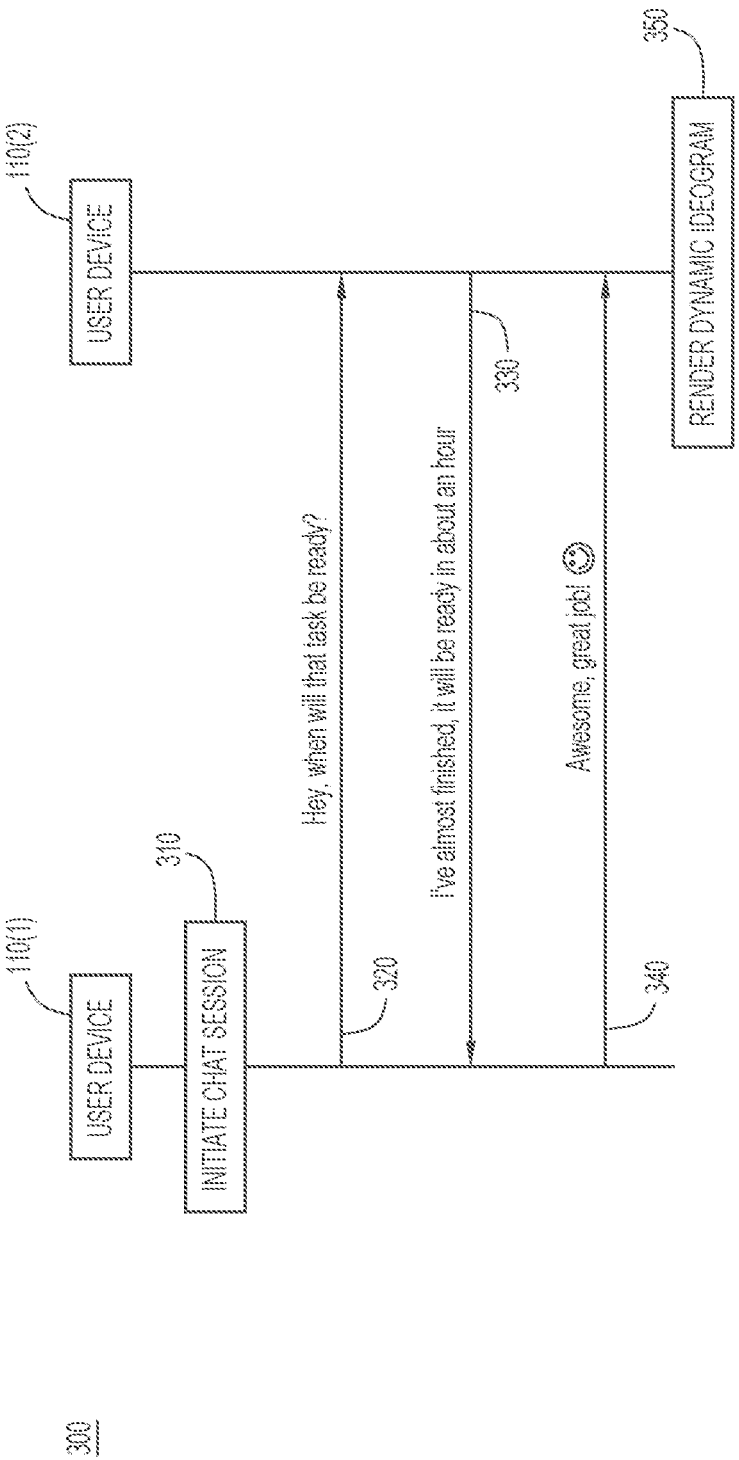
FIG. 3 illustrates a call flow diagram of a method for dynamic interaction of a dynamic ideogram in an electronic messaging environment, according to an example embodiment.

With continued reference to FIG. 1, FIG. 3 illustrates a call flow diagram of an example method 300 for dynamic interaction of a dynamic ideogram in an electronic messaging environment. At operation 310, user device 110(1) initiates a chat session with user device 110(2). At operation 320, user device 110(1) sends, to user device 110(2), a message reading, "Hey, when will that task be ready?" At operation 330, user device 110(2) sends, to user device 110(1), a message reading, "I've almost finished, it will be ready in about an hour." At operation 340, user device 110(1) sends, to user device 110(2), a message reading, "Awesome, great job!" accompanied by a dynamic ideogram in the form of a "smiley face." The messages sent between user device 110(1) and user device 110(2) at operations 320-340 may be sent directly between user devices 110(1) and/or 110(2), or indirectly via messaging server 120.

Messaging server 120, user device 110(1), and/or user device 110(2) may generate instructions for user device 110(2) to render the dynamic ideogram to dynamically interact with the electronic messaging environment, and at operation 350, user device 110(2) may render the dynamic ideogram such that the dynamic ideogram conveys the emotional intent of the sending user through intelligent and interactive behavior. In particular, the dynamic ideogram may help the user of user device 110(1) express delight that the task is almost finished. The dynamic ideogram may be programmed or trained with intelligent interactive behaviors that match the emotional intent of the user of user device 110(1). Once user device 110(2) renders the dynamic ideogram, the dynamic ideogram may dynamically respond to recipient user actions and input as well as the rendered context of messages in the electronic messaging environment, thereby providing the recipient user with a more interactive experience.

Figure 4B:
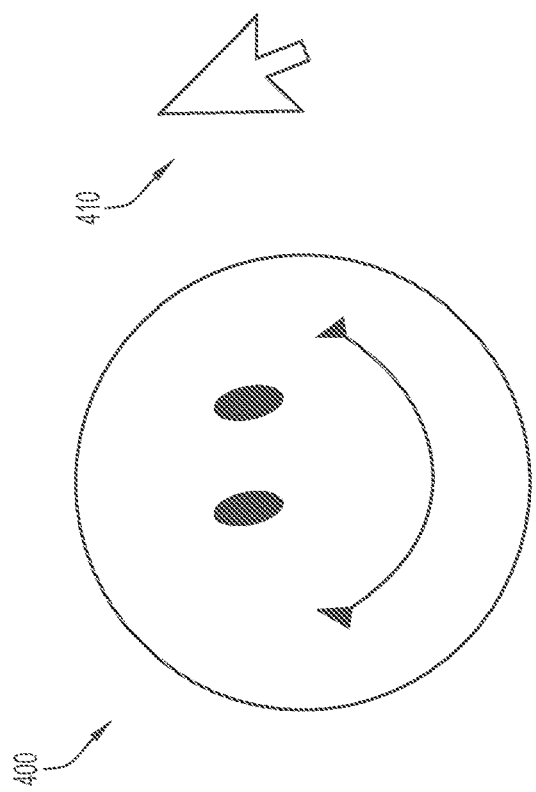
FIGS. 4A and 4B illustrate a dynamic ideogram at a first point in time and a second point in time, according to an example embodiment.
Figure 4A:
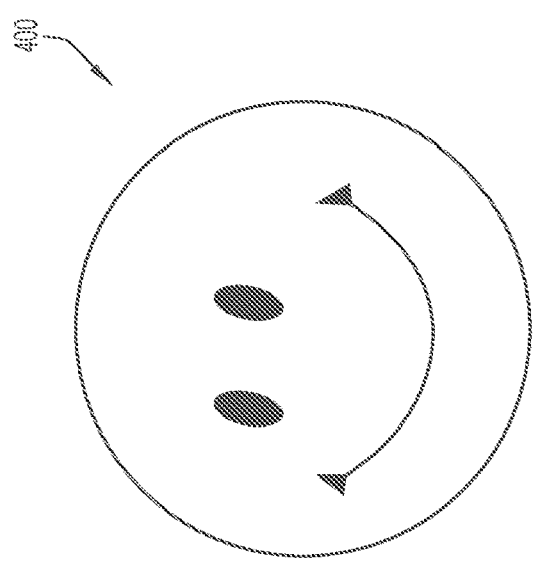

FIGS. 4A and 4B illustrate an example dynamic ideogram 400 at a first point in time and a second point in time. Dynamic ideogram 400 may be the dynamic ideogram sent from user device 110(1) to user device 110(2) at operation 340 (FIG. 3). In this example, dynamic ideogram 400 dynamically re-orients toward the current position of cursor 410 as the recipient user moves cursor 410 around a chat window/application. FIG. 4A illustrates dynamic ideogram 400 at the first point in time. During the first point in time, cursor 410 is located to the left of dynamic ideogram 400, and dynamic ideogram 400 is oriented to face cursor 410 to the left. FIG. 4B illustrates dynamic ideogram 400 at the second point in time. During the second point in time, cursor 410 is located to the right of dynamic ideogram 400, and dynamic ideogram 400 is oriented to face cursor 410 to the right.

Figure 5B:
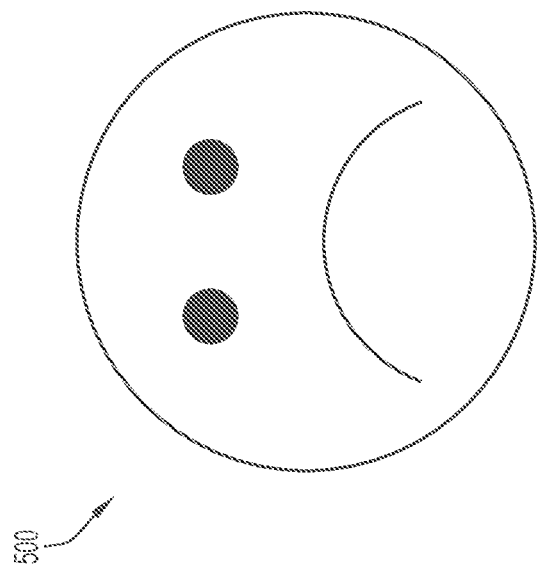
FIGS. 5A and 5B illustrate another dynamic ideogram at a first point in time and a second point in time, according to an example embodiment.
Figure 5A:
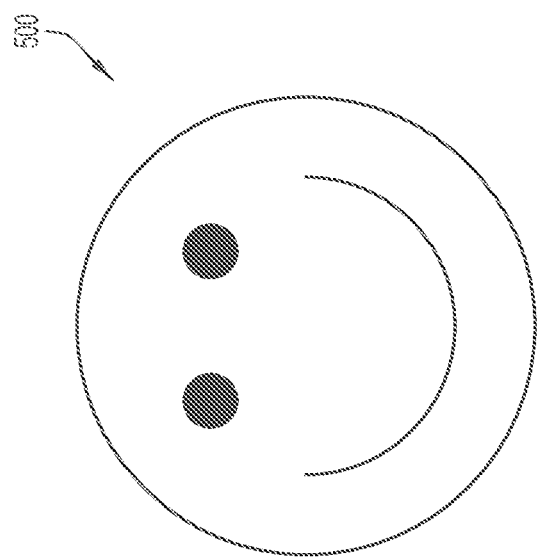

FIGS. 5A and 5B illustrate an example dynamic ideogram 500 at a first point in time and a second point in time. In this example, dynamic ideogram 500 dynamically changes a facial expression due to an extended period of time without a response from a user. FIG. 5A illustrates dynamic ideogram 500 at the first point in time. During the first point in time, the period of time without a response from the user is relatively short, and dynamic ideogram 500 animates a smile. FIG. 5B illustrates dynamic ideogram 500 at the second point in time. During the second point in time, the period of time without a response from the user is relatively long, and dynamic ideogram 500 animates a frown.

Figure 6:
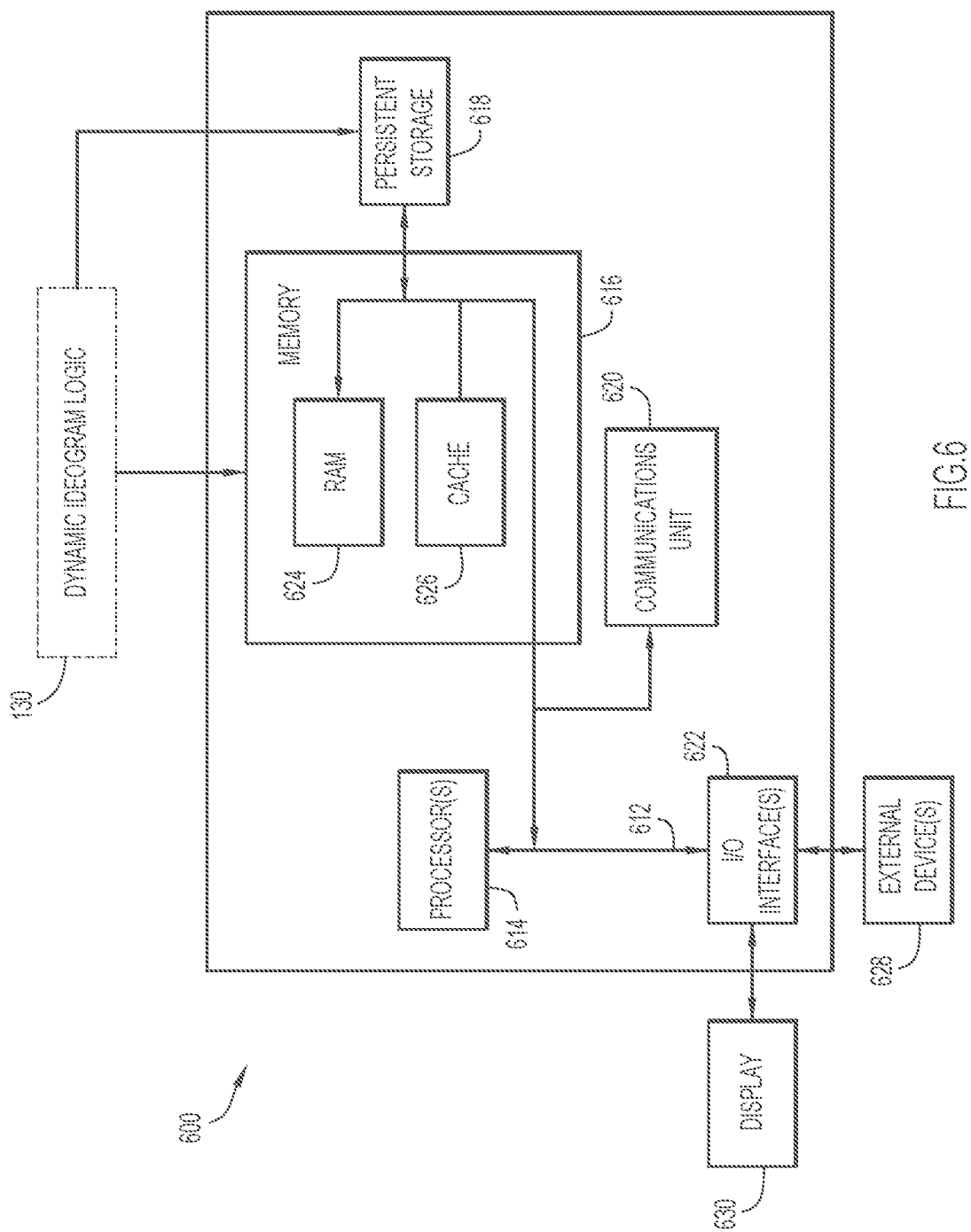
FIG. 6 illustrates a block diagram of a computing device configured for dynamic interaction of a dynamic ideogram in an electronic messaging environment, according to an example embodiment.

FIG. 6 illustrates a hardware block diagram of an example computing device 600 configured for dynamic interaction of a dynamic ideogram in an electronic messaging environment. Device 600 may be messaging server 120, user device 110(1), or user device 110(2) (FIG. 1). It should be appreciated that FIG. 6 provides only an illustration of one embodiment and does not imply any limitations with regard to the environments in which different embodiments may be implemented. Many modifications to the depicted environment may be made.

As depicted, the device 600 includes a bus 612, which provides communications between computer processor(s) 614, memory 616, persistent storage 618, communications unit 620, and Input/Output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media. In the depicted embodiment, memory 616 includes Random Access Memory (RAM) 624 and cache memory 626. In general, memory 616 can include any suitable volatile or non-volatile computer readable storage media. Instructions for dynamic ideogram logic 130 may be stored in memory 616 or persistent storage 618 for execution by computer processor(s) 614.

One or more programs may be stored in persistent storage 618 for execution by one or more of the respective computer processors 614 via one or more memories of memory 616. The persistent storage 618 may be a magnetic hard disk drive, a solid state hard drive, a semiconductor storage device, Read-Only Memory (ROM), Erasable Programmable ROM (EPROM), Flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications unit 620, in these examples, provides for communications with other data processing systems or devices. In these examples, communications unit 620 includes one or more network interface cards. Communications unit 620 may provide communications through the use of either or both physical and wireless communications links.

I/O interface(s) 622 allows for input and output of data with other devices that may be connected to device 600. For example, I/O interface(s) 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

Figure 7:
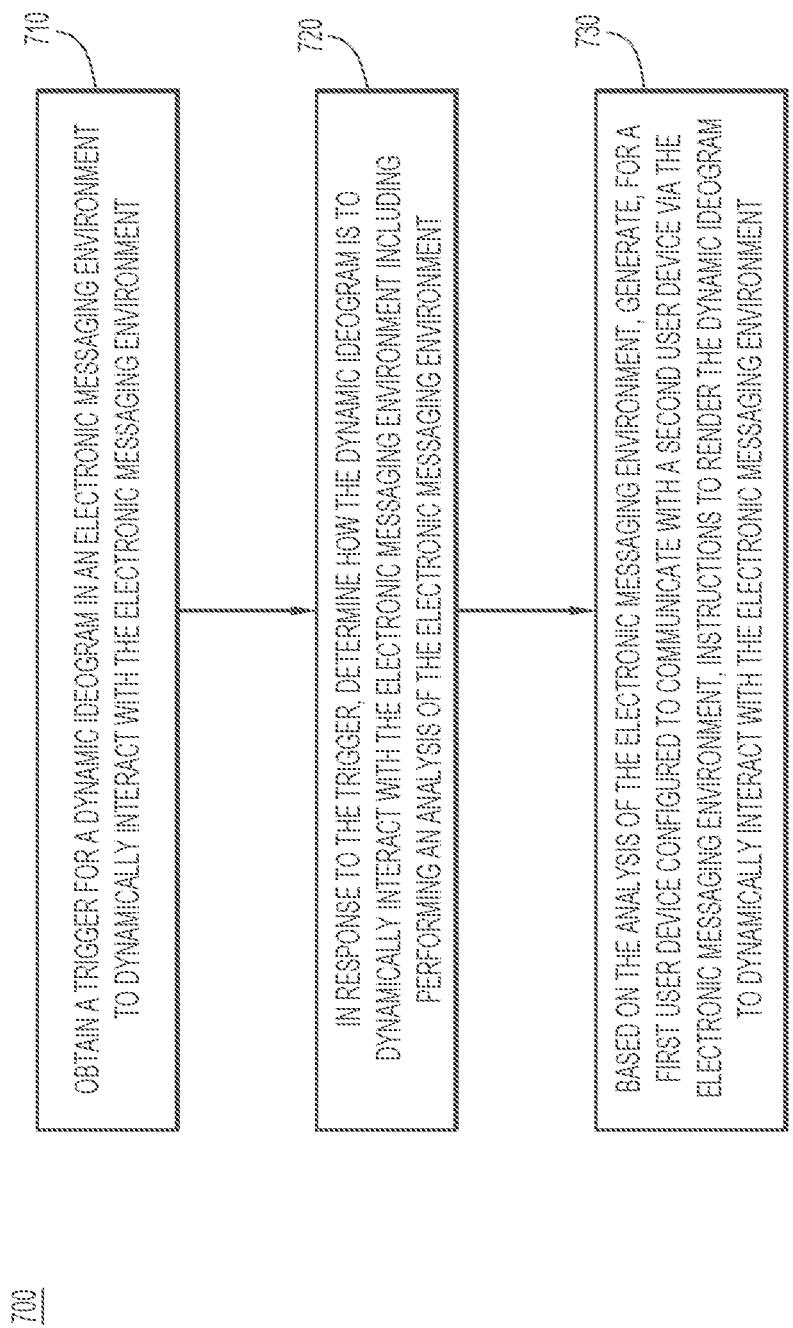
FIG. 7 illustrates a flowchart of a generalized method for dynamic interaction of a dynamic ideogram in an electronic messaging environment, according to an example embodiment.

FIG. 7 is a flowchart of an example method 700 for dynamic interaction of a dynamic ideogram in an electronic messaging environment. At operation 710, a trigger is obtained for a dynamic ideogram in an electronic messaging environment to dynamically interact with the electronic messaging environment. At operation 720, in response to the trigger, it is determined how the dynamic ideogram is to dynamically interact with the electronic messaging environment including performing an analysis of the electronic messaging environment. At operation 730, based on the analysis of the electronic messaging environment, instructions to render the dynamic ideogram to dynamically interact with the electronic messaging environment are generated for a first user device configured to communicate with a second user device via the electronic messaging environment.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, Compact Disc ROM (CD-ROM), Digital Versatile Disk (DVD), memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, EPROM, Flash memory, a Static RAM (SRAM), a portable CD-ROM, a DVD, a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a LAN, a WAN, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, Instruction-Set-Architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one form, a method is provided. The method comprises: obtaining a trigger for a dynamic ideogram in an electronic messaging environment to dynamically interact with the electronic messaging environment; in response to the trigger, determining how the dynamic ideogram is to dynamically interact with the electronic messaging environment including performing an analysis of the electronic messaging environment; and based on the analysis of the electronic messaging environment, generating, for a first user device configured to communicate with a second user device via the electronic messaging environment, instructions to render the dynamic ideogram to dynamically interact with the electronic messaging environment.

In one example, obtaining the trigger includes: determining that a given amount of time has elapsed.

In one example, obtaining the trigger includes: obtaining an indication of a user action from the first user device or the second user device.

In one example, determining how the dynamic ideogram is to dynamically interact with the electronic messaging environment includes: performing a semantic analysis of one or more words in the electronic messaging environment.

In one example, determining how the dynamic ideogram is to dynamically interact with the electronic messaging environment includes: performing an analysis of an interrelatedness of a plurality of messages in the electronic messaging environment.

In one example, determining how the dynamic ideogram is to dynamically interact with the electronic messaging environment includes: performing an analysis based on a language or spelling of one or more words in the electronic messaging environment.

In one example, determining how the dynamic ideogram is to dynamically interact with the electronic messaging environment includes: performing an analysis based on one or more edits made to one or more messages in the electronic messaging environment.

In one example, determining how the dynamic ideogram is to dynamically interact is based on a user availability.

In one example, determining how the dynamic ideogram is to dynamically interact with the electronic messaging environment includes: determining how the dynamic ideogram is to dynamically interact with the electronic messaging environment based on a geographical location of the first user device or the second user device.

In one example, determining how the dynamic ideogram is to dynamically interact with the electronic messaging environment is based on a type of the first user device or the second user device.

In one example, determining how the dynamic ideogram is to dynamically interact with the electronic messaging environment is based on a role in an organization of a user.

In one example, determining how the dynamic ideogram is to dynamically interact with the electronic messaging environment is based on user input.

In one example, determining how the dynamic ideogram is to dynamically interact with the electronic messaging environment includes: determining a length of time since a given message in the electronic messaging environment was sent; and based on the length of time, determining a level of priority of the given message.

In one example, generating the instructions to render the dynamic ideogram includes: generating instructions to render the dynamic ideogram to dynamically interact with a user input.

In one example, generating the instructions to render the dynamic ideogram includes: generating instructions to render the dynamic ideogram to dynamically interact with another dynamic ideogram.

In one example, generating the instructions to render the dynamic ideogram includes: generating instructions to render the dynamic ideogram to dynamically perform one or more dedicated messaging tasks.

In another form, an apparatus is provided. The apparatus comprises: a network interface configured to obtain or provide network communications; and one or more processors coupled to the network interface, wherein the one or more processors are configured to: obtain a trigger for a dynamic ideogram in an electronic messaging environment to dynamically interact with the electronic messaging environment; in response to the trigger, determine how the dynamic ideogram is to dynamically interact with the electronic messaging environment including performing an analysis of the electronic messaging environment; and based on the analysis of the electronic messaging environment, generate, for a first user device configured to communicate with a second user device via the electronic messaging environment, instructions to render the dynamic ideogram to dynamically interact with the electronic messaging environment.

In another form, one or more non-transitory computer readable storage media are provided. The non-transitory computer readable storage media are encoded with processing instructions that, when executed by a processor, cause the processor to: obtain a trigger for a dynamic ideogram in an electronic messaging environment to dynamically interact with the electronic messaging environment; in response to the trigger, determine how the dynamic ideogram is to dynamically interact with the electronic messaging environment including performing an analysis of the electronic messaging environment; and based on the analysis of the electronic messaging environment, generate, for a first user device configured to communicate with a second user device via the electronic messaging environment, instructions to render the dynamic ideogram to dynamically interact with the electronic messaging environment.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   obtaining a trigger for a dynamic ideogram in an electronic messaging environment to dynamically interact with the electronic messaging environment;
   in response to the trigger, and based on a user role in an organization and a typing speed of a user indicative of an emotional intent of the user, determining how the dynamic ideogram is to dynamically interact with the electronic messaging environment by determining a length of time since a given message in the electronic messaging environment was sent and, based on the length of time, determining a level of priority of the given message; and
   in response to determining how the dynamic ideogram is to dynamically interact with the electronic messaging environment, generating, for a first user device configured to communicate with a second user device via the electronic messaging environment, instructions to render the dynamic ideogram to dynamically interact with the electronic messaging environment.

2. The method of claim 1, wherein obtaining the trigger includes:
   determining that a given amount of time has elapsed.

3. The method of claim 1, wherein obtaining the trigger includes:
   obtaining an indication of a user action from the first user device or the second user device.

4. The method of claim 1, wherein determining how the dynamic ideogram is to dynamically interact with the electronic messaging environment further includes:

performing a semantic analysis of one or more words in the electronic messaging environment.

5. The method of claim 1, wherein determining how the dynamic ideogram is to dynamically interact with the electronic messaging environment further includes:
performing an analysis of an interrelatedness of a plurality of messages in the electronic messaging environment.

6. The method of claim 1, wherein determining how the dynamic ideogram is to dynamically interact with the electronic messaging environment further includes:
performing an analysis based on a language or spelling of one or more words in the electronic messaging environment.

7. The method of claim 1, wherein determining how the dynamic ideogram is to dynamically interact with the electronic messaging environment further includes:
performing an analysis based on one or more edits made to one or more messages in the electronic messaging environment.

8. The method of claim 1, wherein determining how the dynamic ideogram is to dynamically interact is further based on a user availability.

9. The method of claim 1, wherein determining how the dynamic ideogram is to dynamically interact with the electronic messaging environment further includes:
determining how the dynamic ideogram is to dynamically interact with the electronic messaging environment based on a geographical location of the first user device or the second user device.

10. The method of claim 1, wherein determining how the dynamic ideogram is to dynamically interact with the electronic messaging environment is further based on a type of the first user device or the second user device.

11. The method of claim 1, wherein determining how the dynamic ideogram is to dynamically interact with the electronic messaging environment is further based on user input.

12. The method of claim 1, wherein generating the instructions to render the dynamic ideogram includes:
generating instructions to render the dynamic ideogram to dynamically interact with a user input.

13. The method of claim 1, wherein generating the instructions to render the dynamic ideogram includes:
generating instructions to render the dynamic ideogram to dynamically interact with another dynamic ideogram.

14. The method of claim 1, wherein generating the instructions to render the dynamic ideogram includes:
generating instructions to render the dynamic ideogram to dynamically perform one or more dedicated messaging tasks.

15. An apparatus comprising:
a network interface configured to obtain or provide network communications; and
one or more processors coupled to the network interface, wherein the one or more processors are configured to:
obtain a trigger for a dynamic ideogram in an electronic messaging environment to dynamically interact with the electronic messaging environment;
in response to the trigger, and based on a user role in an organization and a typing speed of a user indicative of an emotional intent of the user, determine how the dynamic ideogram is to dynamically interact with the electronic messaging environment by determining a length of time since a given message in the electronic messaging environment was sent and, based on the length of time, determining a level of priority of the given message; and
in response to determining how the dynamic ideogram is to dynamically interact with the electronic messaging environment, generate, for a first user device configured to communicate with a second user device via the electronic messaging environment, instructions to render the dynamic ideogram to dynamically interact with the electronic messaging environment.

16. The apparatus of claim 15, wherein the one or more processors are further configured to:
determine that a given amount of time has elapsed.

17. The apparatus of claim 15, wherein the one or more processors are further configured to:
obtain an indication of a user action from the first user device or the second user device.

18. One or more non-transitory computer readable storage media encoded with processing instructions that, when executed by a processor, cause the processor to:
obtain a trigger for a dynamic ideogram in an electronic messaging environment to dynamically interact with the electronic messaging environment;
in response to the trigger, and based on a user role in an organization and a typing speed of a user indicative of an emotional intent of the user, determine how the dynamic ideogram is to dynamically interact with the electronic messaging environment bar determining a length of time since a given message in the electronic messaging environment was sent and, based on the length of time, determining a level of priority of the given message; and
in response to determining how the dynamic ideogram is to dynamically interact with the electronic messaging environment, generate, for a first user device configured to communicate with a second user device via the electronic messaging environment, instructions to render the dynamic ideogram to dynamically interact with the electronic messaging environment.

19. The one or more non-transitory computer readable storage media of claim 18, wherein the processing instructions further cause the processor to:
determine that a given amount of time has elapsed.

20. The one or more non-transitory computer readable storage media of claim 18, wherein the processing instructions further cause the processor to:
obtain an indication of a user action from the first user device or the second user device.

\* \* \* \* \*

UNITED STATES PATENT AND TRADEMARK OFFICE
CERTIFICATE OF CORRECTION

PATENT NO. : 11,128,591 B1  
APPLICATION NO. : 17/004678  
DATED : September 21, 2021  
INVENTOR(S) : Christopher Deering et al.

Page 1 of 1

It is certified that error appears in the above-identified patent and that said Letters Patent is hereby corrected as shown below:

In the Claims

Claim 18, Column 16, Line 35, please replace "environment bar" with --environment by--

Signed and Sealed this  
Sixteenth Day of November, 2021

Drew Hirshfeld  
*Performing the Functions and Duties of the*  
*Under Secretary of Commerce for Intellectual Property and*  
*Director of the United States Patent and Trademark Office*